United States Patent
Ito et al.

(10) Patent No.: US 8,958,581 B2
(45) Date of Patent: Feb. 17, 2015

(54) POLYMER SPEAKER

(71) Applicant: Tokai Rubber Industries, Ltd., Aichi-ken (JP)

(72) Inventors: Takamasa Ito, Aichi-ken (JP); Hitoshi Yoshikawa, Aichi-ken (JP); Mitsuyoshi Kondo, Aichi-ken (JP); Katsuhiko Nakano, Aichi-ken (JP)

(73) Assignee: Tokai Rubber Industries, Ltd., Aichi-ken ( * ) Notice: Subject to any disclaimer, the term of this patent is extended or adjusted under 35 U.S.C. 154(b) by 0 days.

(21) Appl. No.: 14/016,621

(22) Filed: Sep. 3, 2013

(65) Prior Publication Data

US 2014/0003634 A1 Jan. 2, 2014

Related U.S. Application Data

(63) Continuation of application No. PCT/JP2012/080598, filed on Nov. 27, 2012.

(30) Foreign Application Priority Data

Nov. 29, 2011 (JP) ................................. 2011-259892

(51) Int. Cl.
*H04R 17/00* (2006.01)
*C08L 101/00* (2006.01)
*H04R 19/02* (2006.01)
*C08L 101/10* (2006.01)

(52) U.S. Cl.
CPC .............. *H04R 17/00* (2013.01); *C08L 101/00* (2013.01); *H04R 19/02* (2013.01); *C08L 101/10* (2013.01)
USPC .......................................... 381/190; 381/191

(58) Field of Classification Search
CPC ...... H04R 17/00; H04R 19/02; C08L 101/00; C08L 101/10
USPC .......... 381/174, 190, 191, 113, 116; 310/317, 310/328, 330, 800; 367/170, 181
See application file for complete search history.

(56) References Cited

U.S. PATENT DOCUMENTS

| 6,343,129 | B1 * | 1/2002 | Pelrine et al. ................. 381/191 |
| 7,062,055 | B2 | 6/2006 | Pelrine et al. |

(Continued)

FOREIGN PATENT DOCUMENTS

| JP | 63-52599 | 3/1988 |
| JP | 2001-524278 | 11/2001 |

(Continued)

OTHER PUBLICATIONS

International Search Report, mail date is Feb. 26, 2013.

*Primary Examiner* — Tuan D Nguyen
(74) *Attorney, Agent, or Firm* — Greenblum & Bernstein, P.L.C.

(57) ABSTRACT

A polymer speaker is configured to include an electrostrictive element having an elastomer or resin dielectric layer and a plurality of electrode layers arranged on the front and back surfaces of the dielectric layer. The electrode layers are formed from a conductive material including a polymer binder and a conductor and having a modulus of elasticity of 100 MPa or less. The spring constant of the electrode layers in the surface direction is smaller than the spring constant of the dielectric layer in the surface direction. The volume resistivity of the electrode layers is 200 Ω·cm or less. The polymer speaker provides a practical sound pressure in a wide frequency region from low frequencies to high frequencies.

6 Claims, 3 Drawing Sheets

(56) References Cited

U.S. PATENT DOCUMENTS

| | | |
|---|---|---|
| 7,608,989 B2 | 10/2009 | Heydt et al. |
| 7,898,159 B2 | 3/2011 | Heydt et al. |
| 2007/0200467 A1* | 8/2007 | Heydt et al. .................. 310/800 |
| 2007/0242842 A1 | 10/2007 | Kim |
| 2010/0013356 A1* | 1/2010 | Heydt et al. .................. 310/334 |
| 2012/0148074 A1* | 6/2012 | Bastiaens et al. ............. 381/191 |

FOREIGN PATENT DOCUMENTS

| | | |
|---|---|---|
| JP | 2006-5800 | 1/2006 |
| JP | 2007-74502 | 3/2007 |
| JP | 2007-312094 | 11/2007 |
| JP | 2008-270349 | 11/2008 |
| JP | 2011-72112 | 4/2011 |
| WO | 98/35529 | 8/1998 |

* cited by examiner

POLYMER SPEAKER

CLAIM FOR PRIORITY

This application is a Continuation of PCT/JP2012/080598 filed Nov. 27, 2012, and claims the priority benefit of Japanese application 2011-259892, filed Nov. 29, 2011, the contents of which is expressly incorporated by reference herein in its entirety.

TECHNICAL FIELD

The present invention relates to a polymer speaker using an electrostrictive element as a vibrating unit.

BACKGROUND ART

A dynamic speaker unit is known as a speaker that converts an electrical signal into sound. The dynamic speaker unit is configured with a permanent magnet, a voice coil, a diaphragm, and the like. In the dynamic speaker unit, the phases of sound are opposite at the front and the back of the diaphragm. Therefore, when sound from the back comes to the front, the sound from the front and the sound from the back cancel with each other, resulting in a weak sound. In order to block sound coming from the back to the front, the dynamic speaker unit is built into an enclosure to be used. In this case, it is necessary that the air in the enclosure should not interfere with motion of the diaphragm. The enclosure therefore tends to increase in size.

Piezoelectric speakers using piezoelectric materials such as lead zirconate titanate and polyvinylidene fluoride resin have been developed as thin speakers (see, for example, Patent Documents 2 and 3). However, sound in a low frequency region is difficult to be produced because of high rigidity of the piezoelectric materials. In this respect, Patent Documents 4 and 5 disclose a transducer in which a pair of electrodes are arranged on the front and back surfaces of an elastomer dielectric layer. In transducers of this type, when voltage applied between the electrodes is increased, an electrostatic attraction between the electrodes increases, and the dielectric layer interposed between the electrodes is compressed in the thickness direction. The thickness of the dielectric layer is thus reduced. When the thickness of the dielectric layer is reduced, the dielectric layer accordingly expands in the surface direction. On the other hand, when voltage applied between the electrodes is reduced, an electrostatic attraction between the electrodes decreases, and thus, the compression force on the dielectric layer decreases. This increases the thickness of the dielectric layer. When the thickness of the dielectric layer is increased, the dielectric layer accordingly contracts in the surface direction. The transducer can be used as a speaker by utilizing the change in thickness of the dielectric layer with voltage.

RELATED ART DOCUMENTS

Patent Documents

Patent Document 1: Japanese Patent Application Publication No. 2007-312094 (JP 2007-312094 A)
Patent Document 2: Japanese Patent Application Publication No. 2006-5800 (JP 2006-5800 A)
Patent Document 3: Japanese Patent Application Publication No. 2007-74502 (JP 2007-74502 A)
Patent Document 4: Publication of Japanese Translation of PCT Application No. 2001-524278
Patent Document 5: Japanese Patent Application Publication No. 2011-72112 (JP 2011-72112 A)

SUMMARY OF THE INVENTION

Problem to be Solved by the Invention

When the transducer described above is used as a speaker, an AC voltage is superimposed as an electrical signal of sound with a bias voltage being applied to the dielectric layer. In this case, the dielectric layer repeats expansion and contraction in response to the electrostatic attraction between the electrodes. If the electrodes are hard, the electrodes interfere with motion of the dielectric layer, so that a sufficient sound pressure cannot be obtained. Moreover, when the dielectric layer expands, cracks may occur in the electrodes. In this case, the electrodes no longer fulfill their functions because of degradation of conductivity. As will be described below, the harder the electrodes are, the more difficult it is to produce a sound pressure in a low frequency region.

Figure 1:
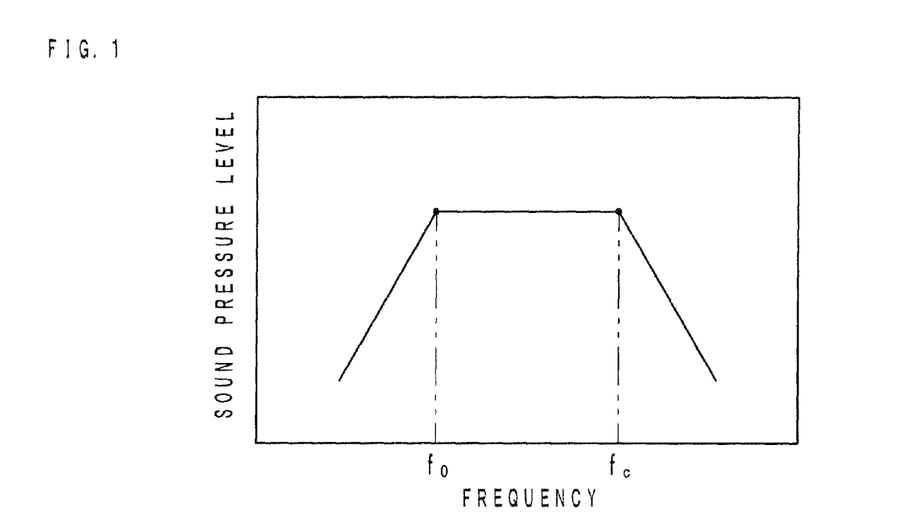
FIG. 1 is a diagram showing sound pressure-frequency characteristics of a speaker.

FIG. 1 shows a schematic diagram of sound pressure-frequency characteristics of a speaker. As shown in FIG. 1, the sound pressure increases in proportion to the frequency in the low frequency region. Here, the frequency at which the sound pressure reaches the maximum is called a primary resonance frequency ($f_0$). The primary resonance frequency is derived by Expression (1) below.

[Expression 1]

$$f_0 = \frac{1}{2\pi}\sqrt{\frac{k}{M}} \qquad (1)$$

$f_0$: Primary resonance frequency [Hz]

$k$: Spring constant of the vibrating unit [N/m]

$M$: Mass of the vibrating unit [g]

As shown in Expression (1), the primary resonance frequency is proportional to the spring constant (k) of the vibrating unit of the speaker. The spring constant is proportional to the modulus of elasticity of the vibrating unit. Therefore, if the modulus of elasticity of the vibrating unit is large, in other words, if a hard material is used for the vibrating unit, the primary resonance frequency increases. That is, in FIG. 1, the primary resonance frequency ($f_0$) shifts rightward (toward higher frequencies). As a result, the sound pressure in the low frequency region decreases. Accordingly, when an electrostrictive element including a dielectric layer interposed between electrodes is used as a vibrating unit of the speaker, sound in the low frequency region is more difficult to be produced with the electrodes having a large spring constant.

As described in Patent Document 5 above, the electrodes of a speaker can be formed from, for example, a conductive material in which a conductor is blended in a polymer binder. In this case, reduction of the blend amount of the conductor lowers the modulus of elasticity of the conductive material, thereby forming flexible electrodes. However, if the blend amount of the conductor is small, the electric resistance of the electrodes increases. If the electric resistance of the electrodes is high, sound in a high frequency region is more difficult to be produced as explained below.

In a speaker using an electrostrictive element including a dielectric layer interposed between electrodes, the electrode layers and the dielectric layer constitute a low-path filter in a pseudo manner in which an electrical resistor and a capacitor are connected in series. Therefore, the cutoff frequency ($f_c$) at which an output sound pressure decreases by 3 db is derived by Expression (2) below.

[Expression 2] (2)

$$f_c = \frac{1}{2\pi RC}$$

$f_c$: Cutoff frequency [Hz]

$R$: Electric resistance of the electrodes [Ω]

$C$: Capacitance of the dielectric layer [F]

As shown in Expression (2), the cutoff frequency is inversely proportional to the electric resistance ($R$) of the electrodes and the capacitance ($C$) of the dielectric layer. Accordingly, the cutoff frequency decreases as the electric resistance of the electrodes increases. That is, in FIG. 1, the cutoff frequency ($f_c$) shifts leftward (toward lower frequencies). As a result, the sound pressure in the high frequency region decreases.

The present invention is made in view of the foregoing situations. An object of the present invention is to provide a polymer speaker that is lightweight, can be reduced in thickness, and produces a practical sound pressure in a wide frequency region from low frequencies to high frequencies.

Means for Solving the Problem

In order to solve the problem described above, a polymer speaker according to the present invention includes an electrostrictive element including a dielectric layer made of an elastomer or a resin and a plurality of electrode layers arranged on front and back surfaces of the dielectric layer. The polymer speaker is characterized in that the electrode layer is formed from a conductive material including a polymer binder and a conductor and having a modulus of elasticity of 100 MPa or less, a spring constant of the electrode layers in a surface direction is smaller than a spring constant of the dielectric layer in a surface direction, and a volume resistivity of the electrode layers is 200 Ω·cm or less.

In the polymer speaker according to the present invention, when an AC voltage as an electrical signal of sound is applied between the electrode layers, the thickness of the dielectric layer changes based on an electrostatic attraction between the electrode layers, thereby vibrating the dielectric layer. Sound is thus produced from both the front side and the back side of the electrostrictive element. The phases of the produced sound are the same at the front side and the back side of the electrostrictive element. Accordingly, unlike a conventional dynamic speaker unit, even when sound output from the back side comes to the front side, the sounds do not cancel with each other. An enclosure is therefore not required. The electrostrictive element includes an elastomer or resin dielectric layer and electrode layers. The polymer speaker according to the present invention is thus thin and lightweight compared with a conventional dynamic speaker unit having a permanent magnet, a voice coil, and the like. Furthermore, it can be produced at relatively low costs. As described above, the polymer speaker according to the present invention is lightweight, can be reduced in thickness, and is relatively inexpensive. It should be noted that "elastomer or resin" means that a base material of the dielectric layer is an elastomer or resin. Any other component such as an additive may be contained in addition to an elastomer or resin component. The elastomer includes rubbers and thermoplastic elastomers.

The electrode layers of the polymer speaker according to the present invention are formed from a conductive material including a polymer binder and a conductor. The modulus of elasticity of the conductive material is 100 MPa or less, and the spring constant of the electrode layers in the surface direction is smaller than the spring constant of the dielectric layer in the surface direction. In the present description, the moduli of elasticity of the electrode layers and the dielectric layer were measured using a strip-shaped sample of 10 mm wide (w) and 25 mm long (l), and the spring constants of the electrode layers and the dielectric layer in the surface direction were calculated by Expression (3) below. It should be noted that "surface direction" is a direction orthogonal to the front-back direction.

[Expression 3] (3)

$$k = E \times \frac{A}{l}$$

$k$: Spring constant [N/m]

$E$: Modulus of elasticity [N/m$^2$]

$A$: Cross-sectional area in the front-back direction (width $w \times$ thickness $t$) [m$^2$]

$l$: Length [m]

Figure 2:
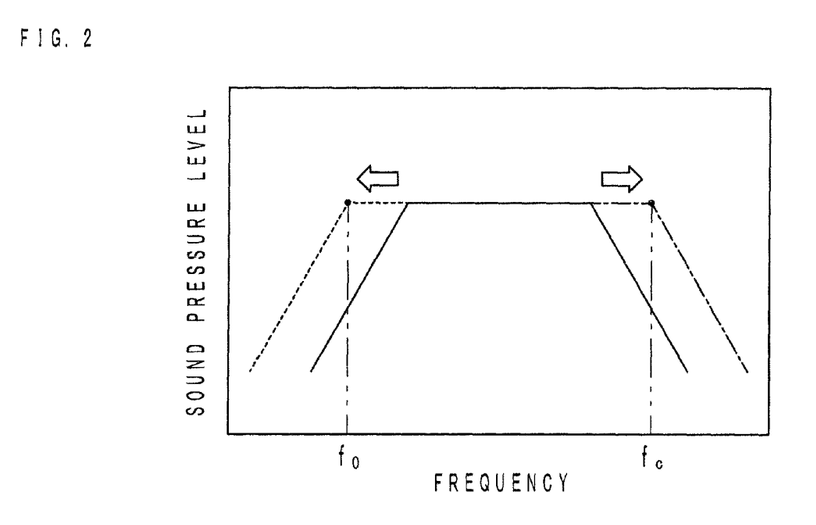
FIG. 2 is a diagram showing sound pressure-frequency characteristics of a polymer speaker according to the present invention.

The electrode layers satisfy the two conditions above and are thus flexible. The electrode layers are therefore unlikely to interfere with expansion and contraction of the dielectric layer and are unlikely to cause cracks even when being expanded. The primary resonance frequency in the electrostrictive element is low because the spring constant of the electrode layers in the surface direction is small. Specifically, as shown by the dotted line in FIG. 2, the primary resonance frequency ($f_0$) shifts leftward (toward lower frequencies). The polymer speaker according to the present invention therefore can produce sound of lower frequencies and allows a sound pressure in the low frequency region to increase.

The volume resistivity of the electrode layers of the polymer speaker according to the present invention is 200 Ω·cm or less. The cutoff frequency is high because the electric resistance of the electrode layers is low. Specifically, as shown by the dashed line in FIG. 2, the cutoff frequency (f) shifts rightward (toward higher frequencies). The polymer speaker according to the present invention therefore can output sound of higher frequencies and allows a sound pressure in the high frequency region to increase. As described above, the polymer speaker according to the present invention can increase the distance between the primary resonance frequency and the cutoff frequency, thereby expanding a reproducible frequency region. In other words, a high sound pressure can be obtained in a wide frequency region from low frequencies to high frequencies.

DESCRIPTION OF THE REFERENCE NUMERALS

1: polymer speaker, 10: electrostrictive element, 11: dielectric layer, 12*a*, 12*b*: electrode layer, 120*a*, 120*b*: terminal portion, 20*a*: front frame, 20*b*: back frame, 21: bolt, 22: nut, 30: DC bias power source, and 31: AC power source.

MODES FOR CARRYING OUT THE INVENTION

Embodiments of a polymer speaker according to the present invention will be described below.

<Polymer Speaker>

[Configuration]

Figure 3:
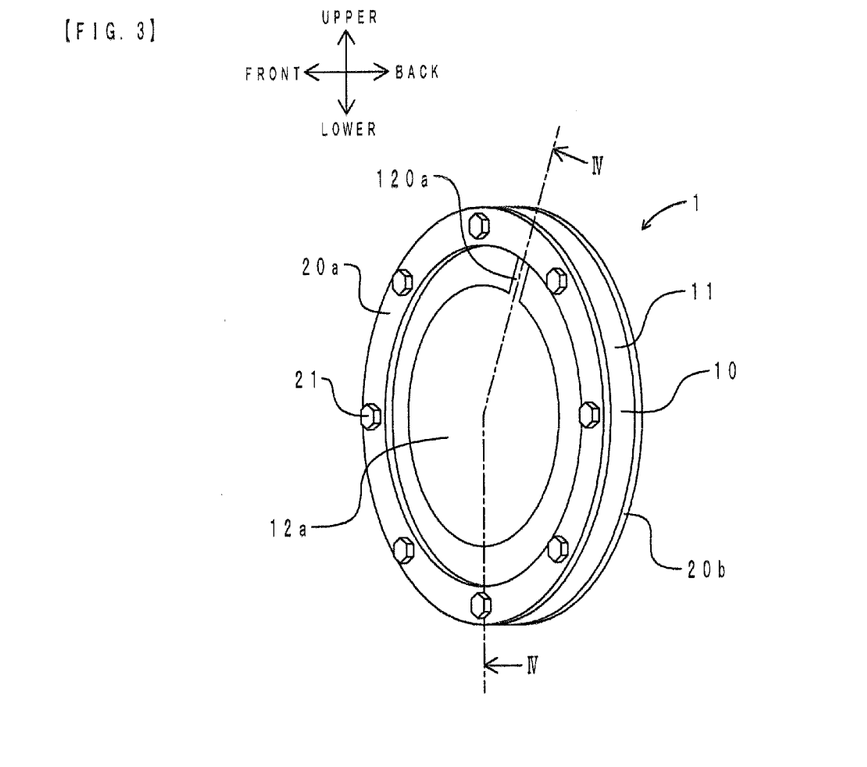
FIG. 3 is a perspective view of the polymer speaker of an embodiment.
Figure 4:
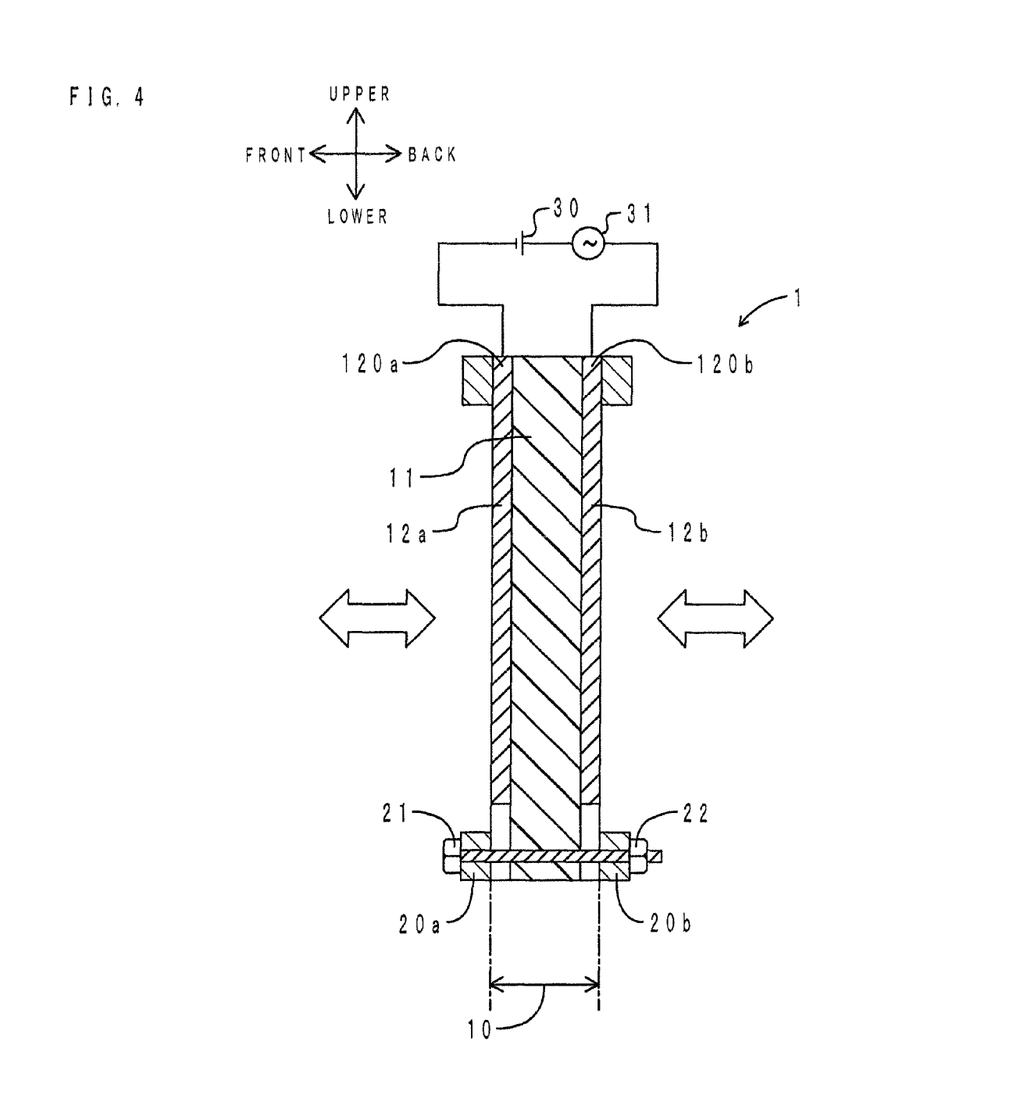
FIG. 4 is a IV-IV sectional view of FIG. 3.

First, a configuration of a polymer speaker of an embodiment of the present invention will be described. FIG. 3 shows a perspective view of the polymer speaker of the present embodiment. FIG. 4 shows a IV-IV sectional view of FIG. 3. As shown in FIG. 3 and FIG. 4, the polymer speaker 1 includes an electrostrictive element 10, a front frame 20*a*, and a back frame 20*b*.

The front frame 20*a* and the back frame 20*b* are both made of resin and have the shape of a ring. The front frame 20*a* and the back frame 20*b* are arranged to be face to each other with a periphery of the electrostrictive element 10 interposed therebetween. The front frame 20*a* and the back frame 20*b* are fixed with eight bolts 21 and eight nuts 22. Sets of "the bolt 21 and the nut 22" are arranged at regular intervals in the circumferential direction of the polymer speaker 1. The bolt 21 passes through the polymer speaker 1, extending from the front surface of the front frame 20*a* to the back surface of the back frame 20*b*. The nut 22 is screwed on the distal end of the bolt 21.

The electrostrictive element 10 is interposed between the front frame 20*a* and the back frame 20*b*. The electrostrictive element 10 includes a dielectric layer 11 and a pair of electrode layers 12*a* and 12*b*. The dielectric layer 11 is made of hydrogenated nitrile rubber (H-NBR) having a modulus of elasticity of 3.5 MPa and has the shape of a circular thin film. The spring constant of the dielectric layer 11 in the surface direction is 75.6 N/m.

The electrode layers 12*a* and 12*b* are both formed from a conductive material including acrylic rubber and ketjen black. The modulus of elasticity of the conductive material is 1.5 MPa. The spring constant of the electrode layers 12*a* and 12*b* in the surface direction is 3 N/m, and the volume resistivity thereof is 14 Ω·cm. The spring constant of the electrostrictive element 10 in the surface direction is 81.6 (=75.6+3+3) N/m, The electrode layers 12*a* and 12*b* both have the shape of a circular thin film with a diameter smaller than that of the dielectric layer 11. The electrode layers 12*a* and 12*b* are both arranged approximately concentrically to the dielectric layer 11. The electrode layers 12*a* and 12*b* have terminal portions 120*a* and 120*b*, respectively. The terminal portions 120*a* and 120*b* protrude from respective upper peripheries of the electrode layers 12*a* and 12*b* in a diameter-increasing direction. The terminal portions 120*a* and 120*b* both have the shape of a strip. A DC bias power source 30 and an AC power source 31 are connected to the terminal portions 120*a* and 120*b* through electric wires.

[Production Method]

A production method for the polymer speaker of the present embodiment will now be described. First, two release films are prepared. A coating including a conductive material is printed on the front surface of one of the release films to form the electrode layer 12*a*. Similarly, the electrode layer 12*b* is formed on the front surface of the other film. Next, the first film is affixed to the front surface of the dielectric layer 11 to transfer the electrode layer 12*a* formed on the film onto the front surface of the dielectric layer 11. The other film is affixed to the back surface of the dielectric layer 11 to transfer the electrode layer 12*b* formed on the film onto the back surface of the dielectric layer 11. The two release films are then stripped off from the dielectric layer 11. The electrode layers 12*a* and 12*b* are thus formed on the front and back surfaces of the dielectric layer 11 to produce an electrostrictive element 10. The periphery of the electrostrictive element 10 is then sandwiched between the front frame 20*a* and the back frame 20*b*. In this state, the front frame 20*a* and the back frame 20*b* are fixed with eight bolts 21 and eight nuts 22. The polymer speaker 1 is thus produced.

[Motion]

The motion of the polymer speaker of the present embodiment will now be described. In an initial state, a predetermined bias voltage is applied to the electrode layers 12*a* and 12*b* from the DC bias power source 30. In this state, an AC voltage based on sound to be reproduced is applied to the electrode layers 12*a* and 12*b* from the AC power source 31. The film thickness of the dielectric layer 11 then changes to cause the electrostrictive element 10 to vibrate in the front-back direction as shown by the white arrow in FIG. 4. This vibrates the air to produce sound.

[Effects]

The effects of the polymer speaker of the present embodiment will now be described. In the polymer speaker 1 of the present embodiment, the electrostrictive element 10 includes the elastomer dielectric layer 11 and the electrode layers 12*a* and 12*b* formed on the front and back surfaces thereof. Thus, the polymer speaker 1 is thinner and lighter than a conventional dynamic speaker unit having a permanent magnet, a voice coil, and the like. Also, the polymer speaker 1 can be produced at relatively low costs. Further, the polymer speaker 1 does not require an enclosure. Therefore, the polymer speaker 1 is lightweight, thin, and relatively inexpensive.

The dielectric layer 11 is made of H-NBR with a modulus of elasticity of 20 MPa or less. The dielectric layer 11 is therefore flexible and expands and contracts well. The electrode layers 12*a* and 12*b* are formed from a conductive material including acrylic rubber as a polymer binder and having a modulus of elasticity of 10 MPa or less. The spring constant of the electrode layers 12*a* and 12*b* in the surface direction is 3 N/m, which is smaller than the spring constant (75.6 N/m) of the dielectric layer 11 in the surface direction. The electrode layers 12*a* and 12*b* are also flexible and can expand/contract together with the dielectric layer 11. In other words, the electrode layers 12*a* and 12*b* are unlikely to interfere with motion of the dielectric layer 11 and unlikely to cause cracks even when being expanded. The spring constant of the electrode layers 12*a* and 12*b* in the surface direction is small, and the spring constant of the electrostrictive element 10 in the surface direction is 3000 N/m or less. Accordingly, the primary resonance frequency in the electrostrictive element 10 is low. Therefore, the polymer speaker 1 can output sound of lower frequencies and allows a sound pressure in the low frequency region to increase.

The volume resistivity of the electrode layers 12*a* and 12*b* is 200 Ω·cm or less. The cutoff frequency is high because the electric resistance of the electrode layers 12*a* and 12*b* is low. The polymer speaker 1 therefore can output sound of higher frequencies and allows a sound pressure in the high frequency region to increase. As described above, with the polymer speaker 1, a high sound pressure can be obtained in a wide frequency region from lower frequencies to high frequencies.

An embodiment of the polymer speaker according to the present invention has been described above. Embodiments of the polymer speaker according to the present invention are not limited to the foregoing embodiment. The electrostrictive element of the polymer speaker according to the present invention will be described in detail below.

<Electrostrictive Element>

The electrostrictive element in the polymer speaker according to the present invention includes an elastomer or resin dielectric layer and a plurality of electrode layers arranged on the front and back surfaces of the dielectric layer.

Examples of the elastomer suitable for the dielectric layer include hydrogenated nitrile rubber (H-NBR), nitrile rubber (NBR), silicone rubber, ethylene propylene diene monomer rubber (EPDM), acrylic rubber, urethane rubber, epichlorohydrin rubber, chlorosulfonated polyethylene, and chlorinated polyethylene. Elastomers modified, for example, by introducing a functional group, such as epoxidized natural rubber and carboxyl group-modified hydrogenated nitrile rubber (XH-NBR), may be used. Alternatively, an elastomer with an additive of a polar low-molecular-weight compound having a polar functional group may be used.

Examples of the resin suitable for the dielectric layer include polyethylene, polypropylene, polyurethane, polystyrene (including cross-linked foamed polystyrene), polyvinyl chloride, vinylidene chloride copolymer, and ethylene-vinyl acetate copolymer.

In view of making the dielectric layer flexible to enlarge a region in which the sound pressure is high toward low frequencies, an elastomer material with a modulus of elasticity of 20 MPa or less can be used for the dielectric layer. Reducing the thickness of the dielectric layer enables more electric charges to be accumulated, thereby increasing an output sound pressure. This can also reduce the spring constant of the dielectric layer in the surface direction.

The dielectric layer may include any other component such as an additive, in addition to the elastomer or resin component. For example, in view of increasing resistance to dielectric breakdown, an insulating inorganic filler may be blended. Examples of the inorganic filler include silica, titanium oxide, barium titanate, calcium carbonate, clay, calcined clay, and talc.

The electrode layer is formed from a conductive material including a polymer binder and a conductor. Elastomer or oil can be used as the polymer binder. In view of forming an expandable/contractible electrode layer, an elastomer is preferable. Examples of the elastomer include cross-linked rubbers such as silicone rubber, NBR, EPDM, natural rubber, styrene-butadiene rubber (SBR), acrylic rubber, urethane rubber, epichlorohydrin rubber, chlorosulfonated polyethylene, and chlorinated polyethylene, and thermoplastic elastomers such as styrene-based, olefin-based, vinyl chloride-based, polyester-based, polyurethane-based, and polyamide-based elastomers. Elastomers modified, for example, by introducing a functional group, such as epoxy group-modified acrylic rubber and carboxyl group-modified hydrogenated nitrile rubber, may be used.

The kind of the conductor is not particularly limited. The conductor can be selected appropriately from carbon materials such as carbon black, carbon nanotubes, and graphite, metal powders such as silver, gold, copper, nickel, rhodium, palladium, chromium, titanium, platinum, iron, and an alloy thereof, and the like. A metal coated non-metallic particle may be used. In this case, the specific gravity of the conductor can be reduced compared to the case where the conductor is formed only from a metal. This prevents precipitation of the conductor and improves dispersibility when a coating is produced. Also, with treatment on particles, conductors in various shapes can be easily produced. Further, the cost of the conductor can be reduced. A metal material listed above such as silver can be used for the metal to be coated. Examples of the particles other than metal include carbon materials such as carbon black, metal oxides such as calcium carbonate, titanium dioxide, aluminum oxide, and barium titanate, inorganic substances such as silica, and resins such as acrylic and urethane resins. The conductor may be used singly or in a combination of two or more.

The modulus of elasticity of the conductive material is 100 MPa or less. It is preferable that the modulus of elasticity of the conductive material should be 10 MPa or less in order to form more flexible electrode layer. The volume resistivity of the conductive material (electrode layer) is 200 Ω·cm or less. In order to reduce the electric resistance of the electrode layers to increase a sound pressure in the high frequency region, it is preferable that the volume resistivity of the electrode layer should be 2 Ω·cm or less. The kind, particle diameter, shape, blend amount, and the like of the conductor may be determined so as to achieve compatibility between the modulus of elasticity and the conductivity of the conductive material.

The conductive material may include, in addition to the polymer binder and the conductor, an additive such as dispersers, reinforcing agents, plasticizers, antioxidants, and colorants, as necessary. For example, when an elastomer is used as the polymer binder, a coating can be prepared in such a way that a conductor and, if necessary, an additive are added to a polymer solution obtained by dissolving a polymer corresponding to the elastomer in a solvent, and stirred and mixed. The prepared coating may be directly applied on the front and back surfaces of the dielectric layer to form electrode layers. Alternatively, electrode layers may be formed by applying the coating on release films, and the formed electrode layers may be transferred onto the front and back surfaces of the dielectric layer.

Various well-known methods can be employed as a method for applying the coating. Examples of the methods include printing methods such as inkjet printing, flexographic printing, gravure printing, screen printing, pad printing, and lithography, the dip method, the spray method, and the bar-coating method. For example, when a printing method is employed, selective coating for a part to be coated and a part not to be coated can be performed easily. Printing in a large area, a thin line, and a complicated shape can also be performed easily. Among the printing methods, the screen printing method is preferable for the reason that a high-viscosity coating can be used and that the thickness of the coated film can be adjusted easily.

In the electrostrictive element, the spring constant of the electrode layers in the surface direction is smaller than the spring constant of the dielectric layer in the surface direction. In order to reduce the spring constant of the electrode layers in the surface direction, it is desirable to reduce the thickness of the electrode layers. In view of increasing a sound pressure in the low frequency region, it is desirable that the spring constant of the electrostrictive element should be 3000 N/m or less. The spring constant of the electrostrictive element is calculated as the sum of the spring constant of the electrode layers in the surface direction and the spring constant of the dielectric layer in the surface direction.

The number of dielectric layers and electrode layers that constitute the electrostrictive element is not particularly limited. For example, one electrode layer can be arranged on each of the front and back surfaces of one dielectric layer as in the foregoing embodiment. Alternatively, a plurality of dielectric layers may be stacked with electrode layers interposed therebetween. In this case, the amount of deformation of the electrostrictive element relative to the applied voltage increases, thereby increasing an output sound pressure. The electrostrictive element may be fixed to a support member such as a frame with the dielectric layer being expanded in the surface direction.

The size and shape of the electrode layer is not particularly limited as long as a voltage can be applied to the dielectric layer. For example, an electrode layer may be arranged so as to cover the entire surface of the dielectric layer. A plurality of strip-shaped or ring-shaped electrode layers may be arranged on the front and back surfaces of the dielectric layer. In the polymer speaker according to the present invention, the overlapping portion between the electrode layer on the front surface of the dielectric layer, the dielectric layer, and the electrode layer on the back surface of the dielectric layer functions as a speaker unit that outputs sound. As the area of the speaker unit (overlapping portion) increases, the capacitance increases. Accordingly, the cutoff frequency shifts toward lower frequencies and the sound pressure in the low frequency region then increases. Therefore, the arrangement pattern of the electrode layers may be adjusted so that a plurality of speaker units capable of reproducing sounds in different frequency regions are set in one polymer speaker.

EXAMPLES

The present invention will now be described more specifically with reference to the examples.

<Electrode Layer>

[Production of Electrode Layer]

Various electrode layers were produced from a polymer for electrode layers, a conductor, and the like shown in Table 1 below. First, a polymer for electrode layers was dissolved in 1000 parts by mass of a solvent to prepare a polymer solution. As a solvent, butyl cellosolve acetate (BCA) was used in Examples 1 to 11 and toluene was used in Example 12. Next, a conductor was added at a predetermined mass ratio to the prepared polymer solution and dispersed therein to prepare a coating. Silver powder added as a conductor was dispersed with a triple roll while the others were dispersed with a bead mill. As for the electrode layers 2 and 4, polyester acid amide and amine salt was also added as a dispersant together with the conductor. As for the electrode layers 9 to 11, polyisocyanate as a cross-linking agent was added to the polymer solution. The prepared coating was then screen-printed on the front surface of an acrylic resin substrate and heated at 150° C. for approximately 1 hour to produce a thin film electrode layer. For comparison, the electrode layer 7 was produced by screen-printing a commercially available carbon paste ("JELCON CH-8" manufactured by JUJO CHEMICAL CO., LTD.) on the front surface of a substrate.

The thicknesses of the produced electrode layers are shown in Table 1. The following materials were used as polymers for electrodes and a cross-linking agent.

Epoxy group-containing acrylic rubber: "Nipol (registered trademark) AR42W" manufactured by ZEON CORPORATION.

Hydroxyl group-containing acrylic rubber A: copolymer (a mass molecular weight of about 0.9 million) of n-ethylacrylate (98% by mass) and 2-hydroxyethyl methacrylate (2% by mass).

Hydroxyl group-containing acrylic rubber B: copolymer (a mass molecular weight of about 0.9 million) of n-butylacrylate (98% by mass) and 2-hydroxyethyl methacrylate (2% by mass).

Polyurethane-based thermoplastic elastomer: "Nippolan (registered trademark) 5193" manufactured by NIPPON POLYURETHANE INDUSTRY CO., LTD.

Silicone rubber: "KE-1935" manufactured by Shin-Etsu Chemical Co., Ltd.

Cross-linking agent: "CORONATE (registered trademark) HL" manufactured by NIPPON POLYURETHANE INDUSTRY CO., LTD.

[Physical Properties of Electrode Layer]

(1) Calculation of Spring Constant

The produced electrode layers were each cut into a strip of 10 mm wide (w) and 25 mm long (l) to fabricate a sample. A tensile test was conducted on the sample in accordance with JIS K7127 (1999), and the modulus of elasticity was calculated from the obtained stress-elongation curve. The calculated modulus of elasticity was substituted into Expression (3) above to calculate the spring constant of the sample in the surface direction. Table 1 shows the moduli of elasticity and the spring constants of the electrode layers.

(2) Measurement of Volume Resistivity

The volume resistivity of the produced electrode layers was measured by a parallel electrode method in accordance with JIS K6271 (2008). Table 1 shows the volume resistivities of the electrode layers.

TABLE 1

|  |  |  | Electrode layer 1 | Electrode layer 2 | Electrode layer 3 | Electrode layer 4 | Electrode layer 5 | Electrode layer 6 | Electrode layer 7 |
|---|---|---|---|---|---|---|---|---|---|
| Raw material | Polymer for electrode layer | Epoxy group-containing acrylic rubber | 100 | 100 | 100 | — | — | — | — |
|  |  | Hydroxyl group-containing acrylic rubber A | — | — | — | — | — | — | — |
|  |  | Hydroxyl group-containing acrylic rubber B | — | — | — | — | — | — | — |
|  |  | Polyurethane-based thermoplastic elastomer | — | — | — | 100 | 100 | 100 | — |
|  |  | Silcone rubber | — | — | — | — | — | — | — |
|  | Conductor | Ketjen black | 10 | 10 | — | 10 | — | — | — |
|  |  | Carbon nanotube | — | 16 | — | 16 | — | — | — |
|  |  | Graphite | — | — | — | — | 5 | 5 | — |
|  |  | Silver powder | — | — | 300 | — | 400 | 400 | — |
|  | Cross-linking agent | Polyisocyanate | — | — | — | — | — | — | — |
|  | Dispersant | Polyester acid amide and amine salt | — | 12 | — | 12 | — | — | — |
| Characteristics of | Thickness [μm] |  | 5 | 5 | 10 | 10 | 10 | 5 | 15 |
|  | Modulus of elasticity [Mpa] |  | 1.5 | 5.5 | 6.0 | 80 | 95 | 95 | 1250 |

TABLE 1-continued

| electrode layer | Spring constant [N/m] | 3.0 | 11 | 24 | 320 | 380 | 190 | 7500 |
|---|---|---|---|---|---|---|---|---|
| | Volume resistivity [Ω · cm] | $1.4 \times 10^1$ | $5.0 \times 10^{-1}$ | $1.0 \times 10^{-4}$ | $1.0 \times 10^0$ | $2.0 \times 10^{-4}$ | $2.0 \times 10^{-4}$ | $2.0 \times 10^{-2}$ |

| | | | Electrode layer 8 | Electrode layer 9 | Electrode layer 10 | Electrode layer 11 | Electrode layer 12 |
|---|---|---|---|---|---|---|---|
| Raw material | Polymer for electrode layer | Epoxy group-containing acrylic rubber | — | — | — | — | — |
| | | Hydroxyl group-containing acrylic rubber A | — | 100 | — | — | — |
| | | Hydroxyl group-containing acrylic rubber B | — | — | 100 | 100 | — |
| | | Polyurethane-based thermoplastic elastomer | 100 | — | — | — | — |
| | | Silcone rubber | — | — | — | — | 100 |
| | Conductor | Ketjen black | 16 | 10 | 10 | 15 | 10 |
| | | Carbon nanotube | — | — | — | — | — |
| | | Graphite | 95 | — | — | — | — |
| | | Silver powder | — | — | — | — | — |
| | Cross-linking agent | Polyisocyanate | — | 4.18 | 4.18 | 4.18 | — |
| | Dispersant | Polyester acid amide and amine salt | — | — | — | — | — |
| Characteristics of electrode layer | Thickness [μm] | | 8 | 5 | 5 | 5 | 5 |
| | Modulus of elasticity [Mpa] | | 800 | 6.5 | 2.0 | 5.0 | 12 |
| | Spring constant [N/m] | | 2560 | 13 | 4.0 | 10 | 24 |
| | Volume resistivity [Ω · cm] | | $2.1 \times 10^{-2}$ | $9.4 \times 10^0$ | $9.8 \times 10^0$ | $3.5 \times 10^0$ | $1.0 \times 10^1$ |

<Dielectric Layer>

[Production of Dielectric Layer]

Various dielectric layers were produced from polymers for dielectric layers and the like shown in Table 2. As for the dielectric layers 1 and 2, first, carboxyl group-containing hydrogenated nitrile rubber polymer ("Therban (registered trademark) XT8889" manufactured by LANXESS) was dissolved in acetylacetone. As for the dielectric layer 3, the above polymer and silica (wet silica "Nipsil (registered trademark) VN3" manufactured by Tosoh Silica Corporation, pH of 5.5 to 6.5, specific surface of 240 m²/g)) were mixed and kneaded with a roll kneader to prepare a rubber composition. The prepared rubber composition was dissolved in acetylacetone. Tetrakis (2-ethylhexyloxy) titanium as an organic metal compound was then added to the resultant polymer solution and mixed. The mixed solution was then screen-printed on the front surface of an acrylic resin substrate and heated at 150° C. for approximately 1 hour to produce a thin film dielectric layer. The thicknesses of the produced dielectric layers are as shown in Table 2.

[Physical Properties of Dielectric Layer]

The produced dielectric layers were each cut into a strip of 10 mm wide (w) and 25 mm long (l) to fabricate a sample. A tensile test was conducted on the sample in accordance with JIS K7127 (1999), and the modulus of elasticity was calculated from the obtained stress-elongation curve. The calculated modulus of elasticity was substituted into Expression (3) above to calculate the spring constant of the sample in the surface direction. Table 2 shows the moduli of elasticity and the spring constants of the dielectric layers.

TABLE 2

| | | | Dielectric layer 1 | Dielectric layer 2 | Dielectric layer 3 |
|---|---|---|---|---|---|
| Raw material | Polymer for dielectric layer | Carboxyl group-containing hydrogenated nitrile rubber | 100 | 100 | 100 |
| | inorganic filler | Silica | — | — | 10 |
| | Cross-linking agent | Tetrakis (2-ethylhexyloxy) titanium | 5 | 5 | 15 |
| Characteristics of dielectric layer | Thickness [mm] | | 54 | 18 | 54 |
| | Modulus of elasticity [Mpa] | | 3.5 | 3.5 | 20.0 |
| | Spring constant [N/m] | | 75.6 | 25.2 | 432 |

<Production of Electrostrictive Element>

Various electrostrictive elements were produced by appropriately combining the produced electrode layers and dielectric layers. First, the electrode layer was cut together with the substrate into a disk shape having a diameter of 50 mm. Next, the electrode layer was affixed together with the substrate to each of the front and back surfaces of the dielectric layer stripped off from the substrate. The substrates were then stripped off from the electrode layers to produce an electrostrictive element including the electrode layer/the dielectric layer/the electrode layer. The electrode layers of the same type were affixed to the front and back surfaces of the dielectric layer. The spring constant of the electrostrictive element was calculated as the sum of the spring constant of the dielectric layer and the spring constant of the two electrode layers. The surface resistivity of the electrostrictive element was measured by a double ring electrode method in accordance with JIS K6271 (2008). Table 3 below shows the spring constants and the surface resistivities of the electrostrictive elements.

TABLE 3

| Structure of electrostrictive element | Example 1 | Example 2 | Example 3 | Example 4 | Example 5 | Example 6 | Example 7 | Example 8 | Example 9 |
|---|---|---|---|---|---|---|---|---|---|
| | Dielectric layer 1 | | | Dielectric layer 2 | | Dielectric layer 3 | | | |
| | Electrode layer 1 | Electrode layer 2 | Electrode layer 3 | Electrode layer 1 | Electrode layer 3 | Electrode layer 1 | Electrode layer 4 | Electrode layer 5 | Electrode layer 6 |
| Spring constant of electrostrictive element [N/m] | 81.6 | 97.6 | 123.6 | 31.2 | 73.2 | 438.0 | 1072.0 | 1192.0 | 812.0 |
| Surface resistivity of electrode layer [Ω] | $1.8 \times 10^3$ | $5.5 \times 10^1$ | $1.0 \times 10^{-2}$ | $1.8 \times 10^3$ | $1.0 \times 10^{-2}$ | $1.8 \times 10^3$ | $1.2 \times 10^2$ | $6.0 \times 10^{-2}$ | $2.9 \times 10^{-2}$ |
| Sound pressure at low frequency (200 Hz) [dB/m] | 63.2 | 60.6 | 54.6 | 63.1 | 61.1 | 46.7 | 41.3 | 40.7 | 43.7 |
| Sound pressure at high frequency (2000 Hz) [dB/m] | 44.6 | 55.9 | 56.9 | 42.0 | 60.2 | 47.5 | 53.3 | 57.8 | 60.1 |

| Structure of electrostrictive element | Example 10 | Example 11 | Example 12 | Example 13 | Comparative Example 1 | Comparative Example 2 |
|---|---|---|---|---|---|---|
| | | Dielectric layer 1 | | | Dielectric layer 1 | |
| | Electrode layer 9 | Electrode layer 10 | Electrode layer 11 | Electrode layer 12 | Electrode layer 7 | Electrode layer 8 |
| Spring constant of electrostrictive element [N/m] | 101.6 | 83.6 | 95.6 | 123.6 | 15075.6 | 5195.6 |
| Surface resistivity of electrode layer [Ω] | $1.2 \times 10^3$ | $1.2 \times 10^3$ | $4.4 \times 10^2$ | $1.3 \times 10^3$ | $2.0 \times 10^0$ | $2.5 \times 10^0$ |
| Sound pressure at low frequency (200 Hz) [dB/m] | 60.5 | 62.2 | 60.8 | 55.6 | 12.1 | 25.2 |
| Sound pressure at high frequency (2000 Hz) [dB/m] | 48.0 | 48.7 | 49.8 | 48.1 | 23.8 | 38.5 |

<Evaluation of Electrostrictive Element>

A DC bias voltage of 30 V/mm relative to the thickness of the dielectric layer was applied to the produced electrostrictive element. In this state, the output sound pressure was measured by applying an AC voltage (3 V/μm) at a low frequency (200 Hz). Similarly, the output sound pressure was measured by applying an AC voltage at a high frequency (2000 Hz). The results are collectively shown in Table 3 above.

As shown in Table 3, the electrostrictive elements of Examples 1 to 13 provided a high sound pressure of 40 dB/m or more irrespective of the level of frequency. By contrast, in the electrostrictive elements of Comparative Examples 1 and 2 in which the modulus of elasticity of the electrode layer (conductive material) exceeded 100 MPa and the spring constant of the electrode layer was greater than the spring constant of the dielectric layer, the sound pressure is less than 40 dB/m both at the high frequency and at the low frequency. Among Examples, in the electrostrictive elements of Examples 1, 2, 4, 5, and 10 to 12, the sound pressures at the low frequency were 60 dB/m or more. Based on this result, it is understood that the sound pressure at a low frequency is greater when the modulus of elasticity of the electrode layer (conductive material) is 10 MPa or less, the spring constant of the electrode layer is smaller than the spring constant of the dielectric layer, and the spring constant of the electrostrictive element is 120 N/m or less. In the electrostrictive elements of Examples 2, 3, 5, and 7 to 9, which include the electrode layers 2 to 6 with a volume resistivity of 2 Ω·cm or less, the sound pressure at the high frequency was greater than those in the electrostrictive elements of other Examples. Based on this result, it is understood that reducing the volume resistivity of the electrode layer is effective in increasing the sound pressure at a high frequency.

INDUSTRIAL APPLICABILITY

The polymer speaker according to the present invention can be used, for example, as a headrest speaker, a seat speaker, a ceiling speaker, a floor speaker, an instrumental panel speaker, and a door speaker for automobiles. The polymer speaker may surely be arranged for other than vehicles. The polymer speaker according to the present invention can be used not only for reproduction of sound but also as an active noise canceller.

The invention claimed is:

1. A polymer speaker comprising:
an electrostrictive element including:
   a dielectric layer made of an elastomer or a resin and
   a plurality of electrode layers arranged on front and back surfaces of the dielectric layer, the polymer speaker characterized in that
the electrode layers are formed from a conductive material including a polymer binder and a conductor and having a modulus of elasticity of 100 MPa or less, a spring constant of the electrode layers in a surface direction is smaller than a spring constant of the dielectric layer in a surface direction, and a volume resistivity of the electrode layers is 200 Ω·cm or less.

2. The polymer speaker according to claim 1, wherein a spring constant of the electrostrictive element that is a sum of the spring constant of the dielectric layer and the spring constant of the electrode layers is 3000 N/m or less.

3. The polymer speaker according to claim 1, wherein the polymer binder of the conductive material is an elastomer.

4. The polymer speaker according to claim 1, wherein the dielectric layer is made of an elastomer having a modulus of elasticity of 20 MPa or less.

5. The polymer speaker according to claim 1, wherein the modulus of elasticity of the conductive material is 10 MPa or less.

6. The polymer speaker according to claim 1, wherein the volume resistivity of the electrode layers is 2 Ω·cm or less.

* * * * *

UNITED STATES PATENT AND TRADEMARK OFFICE
CERTIFICATE OF CORRECTION

PATENT NO. : 8,958,581 B2
APPLICATION NO. : 14/016621
DATED : February 17, 2015
INVENTOR(S) : Takamasa Ito et al.

Page 1 of 1

It is certified that error appears in the above-identified patent and that said Letters Patent is hereby corrected as shown below:

On the Title Page, next to Assignee, item (73), "TOKAI RUBBER INDUSTRIES, LTD." should be -- SUMITOMO RIKO COMPANY LIMITED --.

Signed and Sealed this
Third Day of November, 2015

Michelle K. Lee
*Director of the United States Patent and Trademark Office*